United States Patent [19]

Ledtje et al.

[11] Patent Number: 5,002,662
[45] Date of Patent: Mar. 26, 1991

[54] CHECK VALVE

[75] Inventors: Marvin L. Ledtje, San Jose; Aubrey D. Long, Jr., Milpitas, both of Calif.

[73] Assignee: Spectra-Physics, Inc., San Jose, Calif.

[21] Appl. No.: 321,474

[22] Filed: Mar. 3, 1989

Related U.S. Application Data

[62] Division of Ser. No. 242,467, Sep. 7, 1988, Pat. No. 4,862,907.

[51] Int. Cl.$^5$ .............................................. B01D 15/08
[52] U.S. Cl. ................................ 210/198.2; 210/101; 210/136; 137/512; 137/533.11; 251/368
[58] Field of Search .............. 137/512, 533.11, 533.13, 137/533.15; 251/368; 210/136, 101, 198.2

[56] References Cited

U.S. PATENT DOCUMENTS

| | | | |
|---|---|---|---|
| 2,695,628 | 11/1954 | Wheildon | 137/533.11 |
| 4,139,469 | 2/1979 | Rainin | 137/512 X |
| 4,228,821 | 10/1980 | Stark | 137/533.11 |
| 4,781,213 | 11/1988 | Kilayko | 137/516.29 |
| 4,832,075 | 5/1989 | Dubach | 137/533.11 X |

Primary Examiner—Robert G. Nilson
Attorney, Agent, or Firm—Rosenblum, Parish & Bacigalupi

[57] ABSTRACT

An improved liquid flow check valve using a ball and seat wherein the seat is made of sintered ceramic. The improved valve will operate in an environment of acetonitrile and water without sticking shut, thereby providing more stable liquid flow rates in liquid chromatography systems.

6 Claims, 5 Drawing Sheets

CHECK VALVE

This is a divisional of co-pending application Ser. No. 07/242,467 filed on Sept. 7, 1988, now U.S. Pat. No. 4,862,907.

BACKGROUND OF THE INVENTION

1. Field of the Invention

The present invention relates generally to check valves for restricting the direction of liquid flows in high pressure pumping systems, and more particularly to check valves for pumps used in liquid chromatography systems.

2. DESCRIPTION OF THE PRIOR ART

As depicted generally in FIG. 1a, liquid chromatography systems include reaction columns through which liquids are forced at high pressures, usually by pumps using reciprocating pistons and check valves to control flow direction. The pump driver 1 retracts a piston 2 from a cylinder chamber 3 to lower the cylinder pressure, thereby opening an inlet check valve 4 in an intake passage 5 through which liquid is drawn into the cylinder. Once the cylinder 3 is full, the pump driver advances the piston 2 to pressurize the cylinder to a high pressure, typically in excess of 1000 psi and possibly up to 10,000 psi, thereby closing the inlet check valve 4 and opening an outlet check valve 6 in an exhaust passage through which pressurized liquid is delivered to the column 8.

A check valve operates with a ball which temporarily mates against a seat to seal a passage through the underlying center of the seat. More specifically, as shown in FIG. 1 a conventional check valve 10 is comprised of a body 12 with a cylindrical bore 14 formed between an inlet port 16 and an outlet port 18. Disposed within bore 14, in ascending order, are a retainer 20, a spacer 22, lower check valve 24 parts including a lower seat 26, a lower ball 28 and a lower seat holder 30, a spacer 32, upper check valve 34 parts including an upper seat 36, an upper ball 38 and an upper seat holder 40, and a spacer 42. Upper check valve 34 is identical to lower check valve 24.

Referring to FIG. 2, the valve 10 is exploded to show its parts more clearly. When valve 10 is installed in a pump the body 12 is threadedly mated with a pump housing (not shown) which includes a shoulder serving to retain the parts within bore 14.

FIG. 3 is a partially broken away cross section detailing the interface between, for example, seat 26 and ball 28. Seat 26 has an inside wall 50 defining an axial passage 52. The upper end of wall 50 opens into a chamfered surface 54 which spreads outward to a planar end face 56. Chamfered surface 54 has a mid-portion 58 which is concave and complementary to the surface 60 of ball 28. The lower and upper margins 62 and 64 of surface 54 are rounded to form smooth transitions to wall 50 and to end face 56 respectively.

Useful measurements in liquid chromatography systems require stable solvent flow rates which depend in part upon the amount of leakage, or conversely, the integrity of seals in the check valves. Seal integrity is a function of the tolerance between the (ideally) complementary shapes of seating surfaces 58 and 60 on the seat and ball respectively. For the valve 10 to seal tightly, chamfered surface portion 58 must be well defined and precisely complementary to ball surface 60.

To operate with corrosive liquids check valves are made from inert materials. Conventional stainless steel and other metal alloy seats are not durable enough to maintain their shapes through repeated pounding usage, and tend to become pitted and wear irregularly. As the shape of the seat deteriorates high pressure liquids leak through gaps in the interface between sealing surfaces 58 and 60. Consequently, metal alloys have been widely supplanted by synthetic sapphire and/or ruby crystals which are more rigid and retain their shapes better for more consistently sealing balls and seats.

Sapphire and ruby crystals have varying hardness at various angles to their crystal growth axes, making them difficult to grind, although it is possible to grind sapphire and ruby crystals to tolerances required for check valve balls. However, check valve seats have complex chamfered profiles and have therefore been machined using a diamond broach which scores the chamfered surface 54 with microscopic grinding marks as shown in FIG. 4a.

Relevant prior art valves using sapphire or ruby crystal balls and/or seats are disclosed in the following patents. U.S. Pat. No. 4,094,337 describes a bleed valve using a ball and seat formed from sapphire or ruby crystal to withstand high pressures encountered in steam boilers.

U.S. Pat. No. 4,139,469 describes a standard check valve using sapphire or ruby balls and seats and having an inlet filter to screen contaminant particles from the liquid solvent which might otherwise lodge on and interfere with sealing between the ball and seat surfaces.

In U.S. Pat. No. 4,282,897, interface surface seals are maintained by seats made of a soft metal, such as gold, which yields and conforms to the shape of a sapphire ball surface if the seat surface picks up contaminant particles.

Although sapphire/ruby crystals are strong enough to maintain their shape and sealing ability, it is well known that mixtures of acetonitrile (MECN) and water in a high pressure liquid chromatography mobile phase (generally in a gradient of changing proportions) sometimes cause inlet check valves to stick shut. Heretofore, this problem has been dealt with by replacing stuck valves with new valves as often as once a week until finding a valve that does not stick.

There remains therefore a need for a liquid chromatography pump flow check valve which will not stick shut when operated with mixtures of acetonitrile and water.

SUMMARY OF THE PRESENT INVENTION

It is therefore a primary objective of the present invention to provide check valves that do not stick when used with mixtures of acetonitrile and water.

It is another objective to provide check valves which seal more consistently in liquid chromatography pumping systems.

Liquid chromatography pumping system flow check valves according to the present invention include seats (and preferably balls) made of sintered ceramic. Suitable ceramics include alumina oxide and zirconia oxide ceramic.

Among the advantages of the present invention is that check valves using sintered ceramic seats are expected to have longer lifetimes and to be more reliable for reproducing chromatography processes.

These and other objects of the present invention will become apparent to those skilled in the art upon reading the following detailed disclosure of the preferred embodiment as shown in the several figures of the drawing.

BRIEF DESCRIPTION OF THE DRAWINGS

FIG. 1a is a diagram schematically illustrating a chromatographic system of the type in which the present invention is implemented;

FIG. 2 is an exploded view of the check valve of FIG. 1;

FIG. 3 is a detail view of an interface between one of the balls and seats of the FIG. 1 valve;

FIGS. 4a, 4b, 4c and 4d are SEM images of new, used, failed, and cleaned sapphire crystal seats respectively; and FIGS. 5a and 5b are SEM images of new and used ceramic seats respectively.

DETAILED DESCRIPTION OF THE PREFERRED EMBODIMENT

Figure 1:
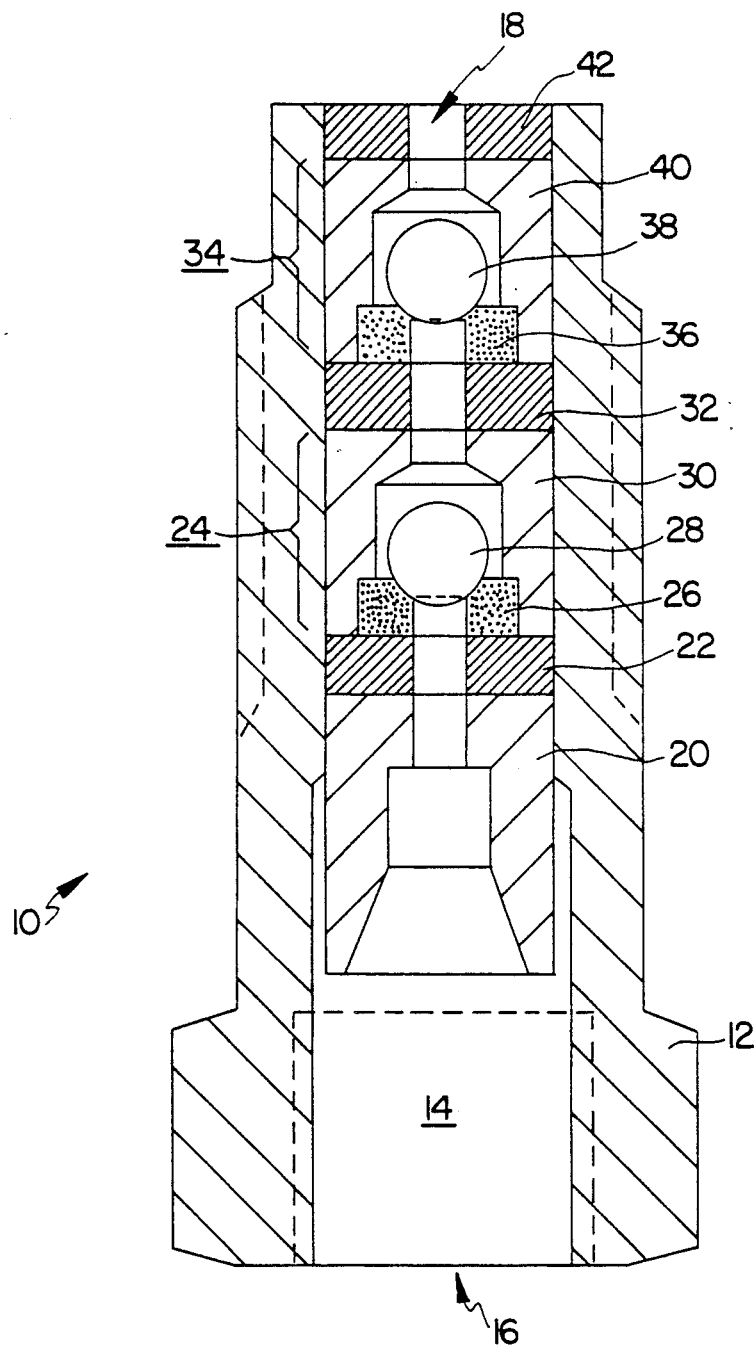
FIG. 1 is a cross-section taken along the axis through a prior art check valve.

In the present invention, to solve the problem of check valves sticking when operated with acetonitrile mixtures, valves in new, used and failed conditions were disassembled and examined To enable the balls and seats to be inspected by scanning electron microscopy (SEM) their surfaces were plated with a conductive and extremely thin (approximately 100 angstrom) layer of gold.

SEM images of crystal balls from new, used and failed valves showed no detectable differences. An SEM image of a new sapphire seat surface 66 as shown in FIG. 4a reveals grinding marks 68, but an SEM image of a used seat surface 70 as shown in FIG. 4b reveals smooth patches 72. An SEM image of a failed (stuck) seat 74 as shown in FIG. 4c reveals an even smoother surface 76.

It has been suggested that geometry differences originally existing between new ball and seat sets in different valves determine the likelihood of the valves sticking. To ascertain whether failed valve seats originally had smoother surfaces or later developed smoother surfaces during use, new (sapphire) seats known to have surface grinding marks 68 as in FIG. 4a were operated with acetonitrile mixtures until failing. Afterwards, SEM inspections confirmed that the failed valve seats had developed smoother surfaces 76 as in FIG. 4c.

In an experiment to learn whether failed seats develop smoother surfaces through being worn or through being coated with deposits, additional valves were operated with various mixtures of acetonitrile and water, so that the seats would develop smoother surfaces 72, 76 which could be used as samples for further analysis.

Valve seats 26 made of alumina oxide in the form of sapphire or ruby crystal routinely failed as expected. Surprisingly, however, valve seats 80 made of alumina oxide in the form of sintered ceramic (in identical geometries) as shown in FIG. 5a, which had been believed to have sealing qualities identical to seats 26 made of alumina oxide in the form of sapphire crystal, did not fail after being run with acetonitrile/water gradients 25 times. This indicates that sintered alumina oxide ceramic seat 80 valves could be operated in acetonitrile environments without sticking. Sintered alumina oxide ceramic check valve balls and seats are available from Imetra Inc. of Elmsford N.Y.

To explain the difference between sticking and non-sticking alumina oxide seats, SEM images of crystal valve seats 26 were compared against images of sintered ceramic valve seats 80. New crystal seats 26 as shown in FIG. 4a as well as new ceramic seats 80 as shown in FIG. 5a featured broach grinding marks 68 and 84 respectively. New crystal seat surface 66 grinding marks 68 faded into smooth patches 72 on used crystal seat surfaces 70 as shown in FIG. 4b. The patches spread into a progressively smoother surface 76 on failed crystal seat surfaces 74 as shown in FIG. 4c. In contrast, new ceramic seat surface 82 grinding marks 84 were still apparent on used ceramic seat surfaces 86 as shown in FIG. 5b.

To characterize the smooth surfaces 72, 76, the used crystal seat 26 shown in FIG. 4b was fired in a 1400 degree F. flame for ten minutes. SEM inspection of the fired surface 78 of the used seat 26 as shown in FIG. 4d revealed grinding marks 68 which had been uncovered from beneath the coating of residue 72. A Fourier transform infra-red (F.T.I.R.) spectra identified components of residue 72 as aliphatic amines, esters and possibly ether.

Apparently, originally rough-scored crystal seat surfaces 66 expose alumina oxide bonding sites which are activated by the presence of water in the solvent mixture and thereby present a reduced steric hindrance to the seeding of aliphatic amines. The other ends of aliphatic amine R groups polymerize and grow into residue patches 72 and 76 coating the surfaces of seats 26.

Despite being made of alumina oxide, sintered ceramic is amorphous, having no crystal structure to present crystal bonding sites. Neither polished nor roughened amorphic alumina oxide ceramic surfaces react with acetonitrile residues. Sintered alumina oxide ceramic is uniformly hard, relatively easy to grind and polish, and resists wear and retains its shape as well as alumina oxide crystal. According to this invention it is hypothesized that at least some other elements from groups IIIB and IVB of the periodic table in pure or oxidized forms having non-polycrystalline (i.e. either amorphous or single-crystal) structures would exhibit non-sticking characteristics comparable to those demonstrated by alumina and zirconia oxides.

Crystal ball surfaces 60 may be too smooth to support the seeding or growth of residue molecules. Although originally smoother, crystal ball surface smoothness is surpassed by the even smoother coating of residue 76 developed on failed crystal seat surface 74. Once coated with acetonitrile residue, stuck valves may be manually freed and reused, but invariably stick again upon reaching the pressure at which they failed. A stuck and freed valve will operate normally with solvents other than acetonitrile (such as methanol) up to a pressure of about 6000 psi. This implies that the smooth coating of residue 76 causes ball and seat interface sticking by surface tension rather than by a chemical reaction. Thus, although smoother interface surfaces are advantageous for tighter sealing, ball and seat surfaces can become so smooth and seal so tightly that they become stuck together.

Although the present invention has been described in a preferred embodiment, it will be appreciated by those skilled in the art that this embodiment may be modified without departing from the essence of the invention. It is therefore intended that the following claims be interpreted as covering any modifications falling within the true scope and spirit of the invention

We claim:

1. In a liquid chromatography system comprising a reaction column and pumping means for forcing liquids through the column, an improved pump means including:
   a chamber;
   an intake passage through which liquids containing an amine and water may be drawn into said chamber when the chamber pressure is reduced;
   an exhaust passage through which said liquids may be delivered from said chamber when its pressure is increased; and,
   disposed in said intake and exhaust passages, respective inlet and outlet flow check valves, each of the type including a ball and, mating therewith, a seat which is formed of alumina oxide formed as a sintered ceramic.

2. A system as in claim 1 wherein said chamber comprises a cylinder with a reciprocable piston.

3. In a liquid chromatography system comprising a reaction column and pumping means for forcing liquids through the column, an improved pump means including:
   a chamber;
   an intake passage through which liquids containing acetonitrile may be drawn into said chamber when the chamber pressure is reduced;
   an exhaust passage through which liquids may be delivered from said chamber when its pressure is increased; and
   disposed in said intake and exhaust passages, respective inlet and outlet flow check valves, each of the type including a ball and, mating therewith, a seat which is formed of alumina oxide formed as a sintered ceramic.

4. In an environment of liquid which at high pressure tends to cause sticking, a liquid chromatography system including a pump with a positive displacement pumping piston and cylinder, and an inlet flow check valve and an outlet flow check valve each having
   a ball made of inert material; and
   a seat made of inert amorphic material, whereby adhesion by deposition of chemicals is forestalled.

5. A check valve as in claim 4 wherein said amorphic material comprises sintered alumina oxide ceramic.

6. A check valve as in claim 4 wherein said amorphic material comprises sintered zirconia oxide ceramic.

* * * * *